March 2, 1965 R. S. HAINES 3,171,520
DRIVE AND BRAKE SYSTEM EMPLOYING METALLIC COATED ROLLERS
AND A ROLLER OF ELASTOMERIC POLYMERIC MATERIAL
Filed March 28, 1963

INVENTOR
ROBERT S. HAINES
BY George O. Saile
ATTORNEY 3,171,520
DRIVE AND BRAKE SYSTEM EMPLOYING METALLIC COATED ROLLERS AND A ROLLER OF ELASTOMERIC POLYMERIC MATERIAL
Robert S. Haines, Poughkeepsie, N.Y., assignor to International Business Machines Corporation, New York, N.Y., a corporation of New York
Filed Mar. 28, 1963, Ser. No. 268,774
9 Claims. (Cl. 192—4)

This invention relates to a high speed drive system for starting, driving at high velocity, and stopping the motion of a driven roller at almost instantaneous accelerations and decelerations.

Oppositely rotating friction rollers or wheels can be used to selectively engage another friction roller or wheel to drive it in one or the other rotational directions. In general, prior art devices have supported high-inertial driving wheels on high-inertia elements which are incapable of the sudden movements necessary to obtain very quick acceleration and decelerations. A digital tape drive system utilizing oppositely rotating friction wheels of this type where very high accelerations and decelerations are possible has been developed and described in prior patent application Serial No. 246,757, filed December 24, 1962, by R. A. Barbeau, J. H. Fagut, D. O. Johnson and E. S. Pearson and assigned to the same assignee as the present invention.

A hard rubber or plastic roller is necessary as either the driven or drive roller in order to obtain the required coefficient of friction for high speed start and stop operations and to alleviate any rebound upon bringing together the drive or brake and driven rollers. The other roller has a metallic surface. The millions of impacts due to the starts and stops of the drive and brake rollers against the driven roller places a severe strain on the chemical structure of the hard rubber or plastic roller in the combination. The physical strain produces unacceptable deterioration of the hard rubber or plastic roll structure. To make one of the rollers in the combination of a hard rubber or plastic material having the required coefficient of friction and maintaining this coefficient of friction over long periods of this battering effect has been, until the present, impossible.

It is therefore an object of this invention to provide in a high speed drive system requiring instantaneous accelerations and decelerations a combination of drive and brake friction rollers, and a driven roller having excellent wear characteristics.

It is another object of this invention to provide drive, brake and driven rollers having surface compositions which are chemically compatible in such a way as to allow large numbers of instantaneous acceleration and deceleration cycles without appreciable wear of the rollers.

It is a further object of this invention to provide drive, brake and driven rollers having chemically compatible surface compositions capable of being used as the drive and braking surfaces for a digital tape drive system that continuously accelerates, drives and decelerates and stops in either direction of movement for millions of cycles without degradation of the roller surfaces and resultant loss of speed of acceleration from tape standstill to the normal reading and writing velocity and of deceleration from normal tape reading and writing velocity to a standstill.

These and other objects are accomplished according to the broad aspects of the present invention by providing a near instantaneous drive system which includes oppositely rotating drive and driven rollers or wheels and a brake roller. The drive and brake rollers can be used to selectively engage the driven friction wheel to drive it in one or the other rotational direction. Electromechanical devices may be respectively connected as actuating members to permit the selective engagement of the drive or brake rollers within the driven friction roller. Either the driven friction roller or the drive and brake means has a metallic coated peripheral surface of a platinum group metal or gold. If the driven roller is metallic, then the drive and brake means engageable with the driven roller for driving or stopping the driven roller have surfaces engageable with the driven roller composed of an elastomeric polymeric material containing nitrile groups. Alternately, if the drive and brake means is metallic then the driven roller would have its peripheral surface composed of the nitrile group containing elastomeric material. The contacting platinum group metal or gold surface and the elastomeric nitrile containing surfaces cooperate in such a manner as to allow the elastomeric surfaces to outwear all other known combinations of surfaces while maintaining a superior coefficient of friction between metallic and polymeric drive means.

The foregoing and other objects, features and advantages of the invention will be apparent from the following more particular description of the preferred embodiments of the invention as illustrated in the accompanying drawings.

Figure 1:
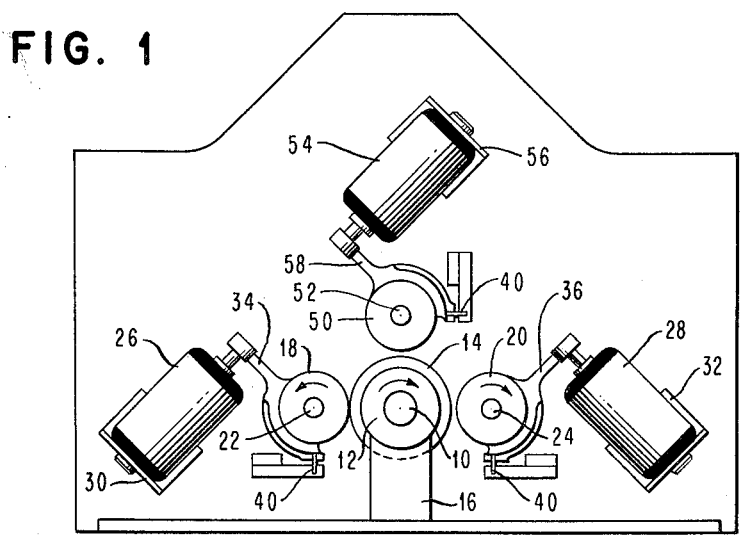
FIGURE 1 is an illustration of the positions of the brake and drive rollers with their actuating means surrounding the driven friction rollers.

Referring now, more particularly, to FIGURE 1 there is shown a schematic illustration of the tape driving and braking arrangement described in prior patent application referred to above. The tape driving and braking arrangement is used to drive a capstan 12 which is fixed on coupling 10. The capstan which is a cylindrical member receives a continuous magnetic tape with approximately a 180° wrap angle. The magnetic tape is moved past a read-write set of heads (not shown) by the capstan for reading and writing on the magnetic tape.

The capstan 12 is driven by a driven friction wheel 14 through the coupling means 10. The coupling means 10 is preferably a fluid coupling means such as described in the patent application referred to above. Other types of coupling means could be used, such as mechanical frictional slidable couplings. However, these mechanical couplings cannot be expected to have the order of reliability as the referred to fluid coupling means. The assembly containing cylindrical capstan 12 and driven wheel 14 is supported by bearing means (not shown) disposed within the frame member 16. The driven friction roller or wheel 14 is engageable by either of two oppositely rotating friction wheels 18 and 20. The rollers 18 and 20 are rotated on shafts 22 and 24, respectively. Electromechanical actuator 26 or 28 fixed to brackets 30 and 32 can be selectively energized to cause drive roller 18 or 20 to engage the friction wheel 14. The actuators are pivotably connected to the shafts 22 and 24 on which the rollers 18 and 20 are connected by means of arms 34 and 36. The arms 34 and 36 are pivoted around pivot points 40. The engagement of the drive roller 18 or 20 to the drive friction wheel 14 causes the rotation of the driven wheel in a forward or backward direction. The distance of the rollers 18 and 20 from wheel 14 is very slight when the rollers are not engaged. This short distance decreases the amount of time involved in the start operation.

A braking roller 50 is similarly positioned close to the driven wheel 14. The brake roller is attached to shaft 52. The brake roller is actuated by actuator 54 which is fixed to bracket 56 and is connected to the shaft 52 by means of arm 58. The actuator pivots the roller around pivot point 40. The brake roller 50 is nonrotational when disengaged from the roller 14. The preferred braking mechanism is disclosed in greater detail in the patent application referred to above. Other braking mechanisms are, of course, possible.

Figure 2:
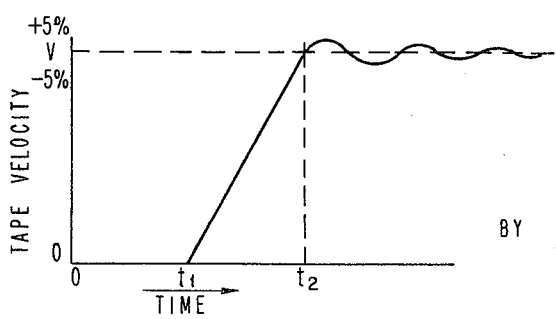
FIGURE 2 is a velocity diagram using the drive system of the present invention as the drive source in a digital tape drive system.

The requirements of this digital tape drive system are extremely stringent, as illustrated by the diagram of FIGURE 2. The drive system must reach a velocity V from a dead stop within a period of microseconds at $t_2$ and alternately must be decelerated from a velocity V to a standstill within microseconds. A presently operating drive system uses a velocity V of 112.5 inches/second with start-stop or acceleration and deceleration times of less than three microseconds required. A portion of this time from zero to $t_1$ is the electrical and mechanical delay time before the roller 18, 20, or 50 is applied to the friction wheel 14. Tape velocity oscillations around velocity V are due both to the coupling between the capstan 12 and the drive roller 14, and to the bounce when the drive or brake and driven wheels are brought together. Stabilization of these oscillations within a minimum of ±5% variation from the optimum tape speed of 112.5 inches/second in the presently operating device is required before the digital tape system can begin its read or write function.

The problem of finding materials to form the surface of the driven wheel 14, the drive rollers 18 and 20, and the brake roller 50 proved to be an exceedingly difficult one. To give sufficient coefficient of friction between the driven and brake or drive rollers either the driven or the drive and brake rollers would have to be of plastic or rubber-like material. This is because, first, a metal-to-metal roller surface contact would have a much lower coefficient of friction and, second, the shock of contact between the rollers would cause oscillation in velocity and harm to the rollers. The great difficulty encountered was in maintaining a sufficiently high coefficient of friction over hundreds of millions of start-stop cycles in the drive and brake rollers, which were chosen as the alternative for being plastic or rubber members of the combination.

A wide range of plastic and rubber materials and formulations were used for the drive and brake rollers and the usual wear resistance smooth metallic coatings were used for the driven roller. These plastic or rubber rollers were unable to withstand the hammering effect of the rollers coming together and apart for more than a few million cycles. The coefficient of friction of the drive and brake rollers would then be degraded to such a value that the start-stop time would be unacceptable for the use in the digital tape drive system. The common wear resistant metal finishes, chromium and nickel, were used throughout these extensive experiments.

The novel combination of the present invention was discovered when rhodium was used as the metallic surface for the driven wheel and an acrylonitrile-butadiene rubber formulation was tried as the surface of the drive and brake rollers. The rubber rollers just would not wear out of the start-stop time specification. After hundreds of millions of start-stop cycles in a test digital tape drive device, the accelerating and decelerating times were practically unchanged from their original values.

These results were quite surprising and unexpected since both chromium and nickel coated driven rollers had been used in conjunction with acrylonitrile-butadiene surfaced drive and brake rollers of the identical formulation with no success whatsoever. The surfaces of the rubber rollers when used with these metals would soon become glazed and the start-stop times would quickly go out of specification for the digital tape drive system. The surface glazing was apparently due to the oxidation and scission reactions caused by the constant hammering of the rubber and metallic surfaces together.

Figure 3:
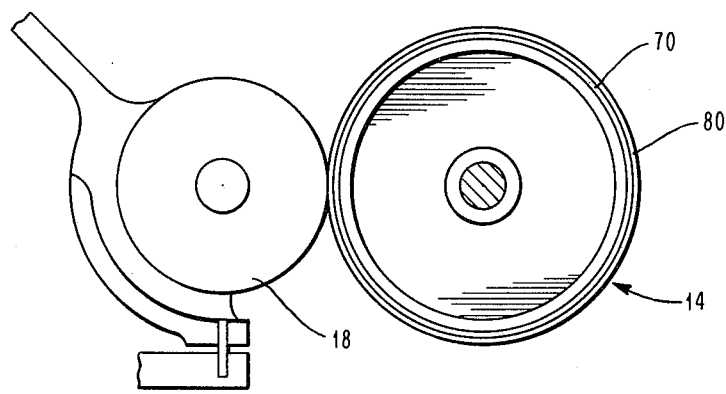
FIGURE 3 is an enlarged illustration of one form of the drive and driven rollers of the invention in contact with one another.

FIGURE 3 illustrates the preferred structure of the drive roller 18 and driven roller 14. The drive rollers 18 and 20 and the brake roller 50 are physically identical and each composed of a carbon blacked loaded, acrylonitrile-butadiene synthetic rubber formulation. The driven roller or wheel 14 is composed of aluminum having a thin coating 70 of nickel on its peripheral surface with a thin coating of either a platinum group metal or gold 80. After nickel is plated on the aluminum surface it is ground to a roughness of 20 to 30 microinches (center line average). The platinum group metal or gold is then plated thereover and will have substantially the surface roughness value that the nickel surface had. Rhodium is the preferred metal in this group because of its hardness and the relative easiness of electroplating. Softer metals, such as gold and platinum, tend to wear off the roller in time.

The following examples specifically illustrate in detail the unexpected ability of the combination of platinum group metal or gold driven roller and the nitrile containing acrylonitrile-butadiene rubber composition to withstand the severe structural and chemical pounding for hundreds of millions of cycles. The examples are included to aid merely in the understanding of the invention and variations may be made by one skilled in the art without departing from the spirit and scope of the invention.

EXAMPLE 1

An acrylonitrile-butadiene rubber roller composition was made by mixing the following formulation on a two roller rubber mill:

| | Grams |
|---|---|
| 55% butadiene, 35% acrylonitrile, 10% methyl acrylic acid (Hycar 1072—produced by the B.F. Goodrich Chemical Company) | 100 |
| Carbon black (oil furnace black, Philback A—produced by the Phillips Petroleum Company) | 35 |
| Stearic acid | 4 |
| Sulfur | 2 |
| Oleyl nitrile | 1 |
| Polymerized trimethyl dihydroquinoline (Agerite Resin D—produced by R. T. Vanderbilt Company, Inc.) | 2 |
| Tetramethylthiuram monosulfide (Unads—produced by the R. T. Vanderbilt Company, Inc.) | 0.4 |
| Zinc oxide | 5 |

The butadiene-acrylonitrile rubber was applied to the rubber mill and banded thereon while the mill was cold. The polymerized trimethyl dihydroquinoline was then added and mixed into the rubber banded on the mill. The stearic acid and carbon black together with the oleyl nitrile plasticizer were mixed into the banded material. After a thorough mixing of the foregoing materials, the curing agents sulfur, zinc oxide and tetramethylthiuram monosulfide were added. The complete mixing cycle took about 20 to 25 minutes with the maximum temperature of approximately 180–200° F. reached during the cycle. The mixture was removed from the two-roller rubber mill and a portion thereof was compression molded around a metal shaft and support structure into the form of a rubber roller. The roller was cured at a temperature of 305° F. for 30 minutes. The rubber surface was ground to a smooth finish of 15 to 45 microinches (center line average). Other rubber rollers were then made by mixing, compression molding, curing and surface grinding in the manner described to provide the brake and drive rollers for the tests in this example.

A chromium peripheral electroplated surface was applied to an aluminum pulley or wheel according to the following procedure.

The aluminum pulley was masked with the exception of its peripheral face with a "stop-off" lacquer. The lacquer was allowed to dry for approximately one hour. The surface to be plated was then soak-cleaned by dipping the pulley in the following solution for 30 seconds maintained at 160° F.:

| | |
|---|---|
| Sodium hydroxide _____oz./gallon__ | 1.2 |
| Sodium bicarbonate _____do____ | 2.7 |
| Sodium tripolyphosphate _____do____ | 0.8 |
| Sodium metasilicate _____do____ | 3.2 |
| Alkyl amyl sulfanate anionic detergent, gm./gallon__ | 2.3 |

The aluminum pulley was then water rinsed and dipped in a 50% by volume solution of hydrochloric acid and water rinsed again. The pulley was then given a dip in the following bath until a gray zinc color was visible all over the peripheral face of the pulley:

| | |
|---|---|
| Sodium hydroxide _____oz./gallon__ | 70 |
| Zinc oxide _____do____ | 13 |
| Specific gravity _____ | 1.407 |

The pulley was then thoroughly rinsed in running cold water.

A copper strike was applied to the cleaned surface in the following bath:

| | |
|---|---|
| Copper cyanide _____oz./gallon__ | 5.5 |
| Sodium cyanide _____do____ | 6.6 |
| Sodium carbonate _____do____ | 4.0 |
| Rochelle salt _____do____ | 8.0 |
| Free cyanide _____% (max.)__ | 0.5 |
| pH _____ | 10.2–10.5 |

The temperature was maintained at 75–90° F. The current density was 24 amps. per feet square for the first four minutes, then reduced to 12 amps. per feet square for one minute.

The periphery of the pulley was then nickel plated with 0.005 inch of nickel in the following bath:

| | |
|---|---|
| Nickel sulfate _____oz./gallon__ | 30–40 |
| Nickel chloride _____do____ | 4–5 |
| Tannic acid _____do____ | 5.5 |
| pH _____ | 4.0 |

The temperature was 130° F. The current density was held at 30 amps per feet square and electroplating was continued for six hours. The pulley was cold water rinsed, then hot water rinsed and air dried with an air gun. The periphery of the pulley was then ground by means ow a grinding wheel until it had a surface roughness of 25.0 microinches (center line average).

The ground nickel plated aluminum periphery of the pulley was then given a flash nickel plate in the following bath:

| | |
|---|---|
| Nickel chloride _____oz./gallon__ | 32 |
| Hydrochloric acid _____pint__ | 1 |

The bath was agitated and the temperature was maintained at room temperature. The nickel electroplating was oc- at room temperature. The nickel electroplating was accomplished at approximately 2.5 volts and a current density of 100–200 amps. per feet square. A uniform flash nickel plate of 2–3 microinches was applied to the peripheral surface of the roller in approximately 30 seconds. The roller was removed from the bath and thoroughly water rinsed and dried.

The nickel plated roller was then placed in the following standard chromium electroplating solution:

| | Oz./gallon |
|---|---|
| Chromic acid _____ | 53 |
| Sulfuric acid _____ | 0.5 |

The bath was agitated and the solution temperature maintained at approximately 120–125° F. The plating was accomplished at 6–8 volts and a current density of 200–225 amps per feet square. A chromium plating of approximately 50 microinches was deposited over the nickel coating. The chromium plated roller was removed from the plating bath and thoroughly rinsed in water and dried.

The "stop-off" lacquer was removed with ethyl acetate and the roller was dried.

The chromium plated wheel together with two of the rubber surfaced rollers made according to the above mentioned procedure were positioned on a test digital tape drive machine of the type described above. The chromium wheel was inserted as the driven roller, while one rubber roller was made the drive roller and the second rubber roller was the brake roller. The tape drive test mechanism was designed to be started, driven, stopped and rested continuously for millions of such start-stop cycles to determine the wearability of the respective rollers. A precise cycle comprised the starting of the metal driven roller from a dead stop by means of the drive rubber roller and accelerating the driven roller to a speed of 112.5 inches per second within three microseconds. This speed was maintained for five milliseconds, then the brake roller was applied and within three microseconds the driven roller was stopped to a complete halt. The driven roller was rested for five milliseconds at a halt, then the drive roller would be applied again to start a new cycle. The following table gives the results of two chromium rollers together with their respective rubber drive and brake rollers tested on the test tape drive mechanism.

*Table A*

| | Surface roughness (in microinches CLA) | No. of Cycles | Time to reach 112.5 inch/sec. (in microseconds) | | Percent increase in time to reach 112.5 inch/sec. |
|---|---|---|---|---|---|
| | | | Initial | Final | |
| Chromium driven roller #1_____ | 25.6 | 13×10⁶ | | | |
| Rubber drive roller_ | | 13×10⁶ | 2.5 | 5.0 | 100 |
| Chromium driven roller #2_____ | 25.0 | 12.6×10⁶ | | | |
| Rubber drive roller_ | | 12.6×10⁶ | 2.4 | 3.1 | 29 |

The rubber roller in each case had a glazed surface appearance which is visual evidence of the reduction in the roller's coefficient of friction.

EXAMPLE 2

A nickel plated wheel was made according to the procedure of Example 1 and by stopping after the water rinse step preceding the chromium plating step of that example. Following the water rinse step the lacquer was removed by dissolving it in ethyl acetate. The wheel was thoroughly rinsed and dried.

The nickel plated wheel together with acrylonitrile-butadiene rubber roller made according to the procedure of Example 1 were tested on the test tape drive machine according to the general procedure given in Example 1. The following table gives the wearability results of the nickel plated roller together with its rubber drive and brake rollers tested on the test tape drive mechanism:

*Table B*

| | Surface roughness (in microinches CLA) | No. of Cycles | Time to reach 112.5 inch/sec. (in microseconds) | | Percent increase in time to reach 112.5 inch/sec. |
|---|---|---|---|---|---|
| | | | Initial | Final | |
| Nickel driven roller_ | 20.5 | 73×10⁶ | | | |
| Rubber drive roller_ | | 73×10⁶ | 2.6 | 3.0 | 15 |

The surface of the rubber drive roller had a slightly glazed appearance.

EXAMPLE 3

A rhodium peripheral electroplated surface was applied to an aluminum pulley or wheel treated according to the procedure given in Example 1 through the water rinse step after the flash nickel plate.

The nickel plated wheel was then placed in the following standard rhodium electroplating bath:

Rhodium sulfate _____ grams per liter__ 5
Sulfuric acid _____ cubic centimeters per liter__ 30

The plating solution was agitated and its temperature maintained at 108° F. The plating was accomplished at approximately 1.4 volts and a current density of 70 amps per feet square. It took 2.5 minutes to plate a uniform thickness of 50 microinches of rhodium onto the nickel surface of the roller. The rhodium plated roller was removed from the plating bath and thoroughly water rinsed and dried. The roller was immersed in an ethyl acetate bath to remove the "stop-off" lacquer and then thoroughly rinsed and dried.

The testing procedure on the digital drive tape system was made according to the procedure given in Example 1. The following table gives the wearability results of two separate rhodium plated rollers made according to the above procedure together with their respective brake and drive acrylonitrile-butadiene rubber rollers, which were made according to the procedure of Example 1:

*Table C*

| | Surface roughness (in microinches CLA) | No. of Cycles | Time to reach 112.5 inch/sec. (in microseconds) | | Percent increase in time to reach 112.5 inch/sec. |
|---|---|---|---|---|---|
| | | | Initial | Final | |
| Rhodium driven roller #1 | 25.0 | 204×10⁶ | | | |
| Rubber drive roller | | 204×10⁶ | 2.5 | 2.6 | 4 |
| Rhodium driven roller #2 | 25.2 | 417.6×10⁶ | | | |
| Rubber drive roller | | 417.6×10⁶ | 2.6 | 2.5 | −4 |

The rhodium rollers were blackened but the metallic surface showed through. All rollers, metallic and rubber, are still as usable as they were initially after hundreds of millions of cycles.

EXAMPLE 4

A gold plated driven roller was made according to the general procedure of Example 3 except the rhodium electroplating bath was replaced with the following gold strike bath:

Troy oz./gallon
Gold metal _____ 0.2
Free cyanide _____ 10

The bath was hand agitated and the solution maintained at 100° F. A plating of 2–3 microinches was applied to the nickel surface in 5–10 seconds using 4 volts potential. The roller was removed from the bath.

A hard gold plating of 50 microinches was applied to the gold surface with the following bath:

Troy oz./gallon
Gold metal _____ 1
Free cyanide _____ 11

The solution was mechanically agitated and the temperatured held at approximately 65° F. for three minutes. The current density was approximately 3 amps per feet square. The gold plated roller was removed from the plating bath and thoroughly rinsed and dried. The plated roller was immersed in ethyl acetate to remove the "stop-off" lacquer. The roller was then thoroughly rinsed and dried.

The gold roller together with its pair of acrylonitrile-butadiene rubber drive and brake rollers, which were made according to the Example 1 procedure, were inserted in the test apparatus. The test was conducted as in the other examples and the following results obtained:

*Table D*

| | Surface roughness (in microinches CLA) | No. of cycles | Time to reach 112.5 inch/sec. (in microseconds) | | Percent increase in time to reach 112.5 inch/sec. |
|---|---|---|---|---|---|
| | | | Initial | Final | |
| Gold driven roller | 30 | 367.8×10⁶ | | | |
| Rubber drive roller | | 367.8×10⁶ | 2.7 | 2.8 | 4 |

The gold roller was blackened with its metallic surface showing through. Spots of he nickel underlayer showed through the gold coating. This was indicative of the wearing off of the gold electroplate. The coefficient of friction of the combination of rollers was, however, still within the specification as shown by the less than three microsecond acceleration time to tape operation speed.

A comparison of the results of the examples given in Tables A, B, C and D clearly show the unexpected increase in the acrylonitrile-butadiene rubber roller useful lifetime by using rhodium or gold as the driven roller surface rather than chromium or nickel. The surfaces of the rubber rollers in Examples 1 and 2. Tables A and B, had become glazed to the extent that their start-stop times were out of the desired range. In contrast, the surface of the rubber rollers in Examples 3 and 4. Tables C and D, had not been harmfully affected and still remained useful.

Inspection of the achylonitrile-butadiene rubber rollers and the surface of the rhodium or gold driven rollers of Examples 3 and 4 were made both visually and by infrared spectra analysis. The driven rollers had noticeably blackened. The rubber rollers, both drive and brake, did not have the characteristic glaze that had been present when chromium or nickel were used as the surface for the driven roller. Infra-red spectra analysis on the unused acrylonitrile-butadiene roller, on the rubber rollers after the several hundred million cycles and on the surface of the metallic driven roller was made by extraction and reflection procedures. There was a decided reduction in the nitrile [C—N] group at the 2240 band of the infrared spectra from the original rubber roller surface to the surface of the rubber roller after the several hundred million cycles. The black material on the surface of the rhodium or gold driven rollers also contained a low nitrile [C—N] group constituent. It is theorized that the platinum group metal or gold surface driven roller catalyzes the following chemical reaction which reduces the nitrile group on the polymeric chain in part to the polymeric amine forms:

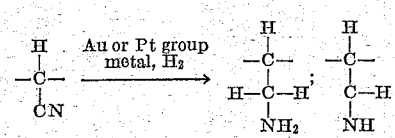

which substantially maintains the rubber roller's original coefficient of friction and suppresses the oxidization and scission reactions which tends to lower the coefficient of friction of the rubber rollers.

Results comparable to the Examples 3 and 4 can be obtained using other platinum group metals, i.e., platinum, palladium, osmium, iridium and ruthenium, alone or in combination, with or without rhodium and gold. The metals in this grouping provide the necessary catalytic action, comparable to rhodium and gold used in the examples, on the nitrile group to suppress surface glazing and the resultant lowering of the coefficient of friction. The hardness and softness of certain of these metals must, however, be taken into consideration when the use of one or more of the metals as a roller surface is contemplated. For example, platinum is a relatively soft metal and will tend to wear in time. Alternatively, iridium is very hard and would tend to crack after long periods of the constant hammering against the rubber roller. These metals are used preferably in alloy combinations with other metals of the listed group in proportions that will temper the softness or hardness of the pure metal coating.

The invention is, of course, not limited to the precise surface formulation of the rubber roller in the foregoing examples. Similar results can be obtained by varying the percentage of the acrylonitrile in the acrylonitrile-butadiene copolymer from 20 to 50%. The methyl acrylic acid which is used in the formulation to help harden and toughen the rubber may be substituted in toto or in part by acrylic acid or a similar material. In other applications, the methyl acrylic acid ingredient may be eliminated where the strain on the physical and chemical structure of the rubber rollers is less than in the present application and the higher toughness and hardness are not required. The loading of the nitrile rubber with carbon black may be varied depending upon the hardness of the finished roller desired as is understood by those skilled in the art. The particular carbon black used is not critical. Further, other conventional lubricants, plasticizers, curing agents and anti-oxidants known to those skilled in the art may replace, respectively, the stearic acid; oleyl nitrile; sulfur, zinc oxide and tetramethylthiuram monosulfide; and polymerized trimethyl dihydroquinoline used in the formulation.

The invention thus provides a high speed drive system that is capable of almost instantaneous acelerations and decelerations. The drive, brake and driven friction rollers that make up the drive system have a novel combination of surface compositions which are chemically compatible in such a way as to allow large numbers of instaneous accelerations and decelerations without harmful wear of the roller surfaces.

While this invention has been particularly shown and described with reference to preferred embodiments thereof, it wil be understood by those skilled in the art that the foregoing and other changes in form and details may be made therein without departing from the spirit and scope of the invention.

What is claimed is:

1. In a high speed drive system requiring instantaneous accelerations and decelerations, the combination comprising:
   a driven friction roller having a metallic coated peripheral surface selected from the group consisting of ruthenium, rhodium, palladium, osmium, iridium, gold, platinum and alloy combinations thereof; and a drive and brake means engageable with said driven roller for driving or stopping the same;
   said drive and brake means having its surface engageable with said driven roller composed of an elastomeric polymeric material containing nitrile groups.

2. In a high speed drive system requiring instantaneous accelerations and decelerations, the combination comprising:
   a driven friction wheel having a rhodium coated peripheral surface;
   a drive friction wheel engageable with said driven wheel;
   a braking friction wheel engageable with said driven wheel;
   said drive and braking wheels having their peripheral surfaces composed of a cured elastomeric polymeric material which includes an acrylonitrile-butadiene copolymer containing from about 20 to 50% by weight acrylonitrile and finely divided carbon black; and
   means for selectively and independently engaging the said driven wheel with said drive and braking wheels.

3. In a high speed drive system requiring instantaneous accelerations and decelerations, the combination comprising:
   a driven friction wheel having its peripheral surface composed of a cured elastomeric polymeric material which includes an acrylonitrile-butadiene copolymer containing from about 20 to 50% by weight acrylonitrile and finely divided carbon black;
   a drive friction wheel having a rhodium coated peripheral surface engageable with said driven wheel;
   a braking friction wheel having a rhodium coated peripheral surface engageable with said driven wheel; and
   means for selectively and independently engaging the said driven wheel with said drive and braking wheels.

4. In a system requiring frictional engagement between two members, the combination comprising:
   first and second frictionally engageable surfaces;
   the said first surface composed of rhodium metal;
   the said second surface composed of a cured elastomeric polymeric material including acrylonitrile-butadiene copolymer.

5. In a high speed drive system requiring instantaneous accelerations and decelerations, the combination comprising:
   a driven friction roller having a rhodium coated peripheral surface;
   a drive friction wheel engageable with said driven wheel;
   a braking friction wheel engageable with said driven wheel;
   said drive and braking wheels having their peripheral surfaces composed of a cured elastomeric polymeric material including acrylonitrile-butadiene copolymer.

6. In a high speed drive system requiring instantaneous accelerations and decelerations, the combination comprising:
   a driven friction roller having at least its peripheral surface composed of an elastomeric polymeric material containing nitrile groups; and
   a drive and brake means engageable with said driven roller for driving or stopping the same;
   said drive and brake means having the surfaces engageable with said driven roller composed of a metallic coating selected from the group consisting of ruthenium, rhodium, palladium, osmium, irridium, gold, platinum and alloy combinations thereof.

7. In a high speed drive system requiring instantaneous accelerations and decelerations, the combination comprising:
   a driven friction wheel having its peripheral surface composed of a cured elastomeric polymeric material including acrylonitrile-butadiene copolymer;
   a drive friction wheel having a rhodium coated peripheral surface engageable wtih said driven wheel; and
   a braking friction wheel having a rhodium coated peripheral surface engageable with said driven wheel.

8. In a system requiring frictional engagement between two members, the combination comprising:
   first and second frictionally engageable surfaces;
   the said first surface composed of a metal selected from the group consisting of ruthenium, rhodium, palladium, osmium, iridium, gold, platinum and alloy combinations thereof; and
   the said second surface composed of an elastomeric polymeric material containing nitrile groups.

9. In a system requiring frictional engagement between two members, the combination comprising:
   first and second frictionally engageable surfaces;
   the said first surface composed of rhodium metal; and
   the said second surface composed of a cured elastomeric polymeric material which includes an acrylonitrile-butadiene copolymer containing from about 20 to 50% by weight acrylonitrile and finely divided carbon black.

References Cited by the Examiner

UNITED STATES PATENTS

| | | | |
|---|---|---|---|
| 1,045,781 | 11/12 | Fessenden | 192—21.5 X |
| 2,221,661 | 11/40 | Woolf | 74—214 |
| 2,817,243 | 12/57 | Dean | 74—214 |
| 2,950,624 | 8/60 | Boehm | 74—202 |
| 3,104,917 | 9/63 | Schwartzwalden. | |

DAVID J. WILLIAMOWSKY, *Primary Examiner.*

UNITED STATES PATENT OFFICE
CERTIFICATE OF CORRECTION

Patent No. 3,171,520                                  March 2, 1965

Robert S. Haines

It is hereby certified that error appears in the above numbered patent requiring correction and that the said Letters Patent should read as corrected below.

Column 5, line 46, for "ow" read -- of --; line 55, strike out "at room temperature. The nickel electroplating was oc-"; column 8, line 17, for "he" read -- the --; line 33, for "achylonitrile-butadiene" read -- acrylonitrile-butadiene --; line 53, for "polymeric", second occurrence, read -- imine and --; same column 8, lines 56 to 60, the right-hand formula should appear as shown below instead of as in the patent:

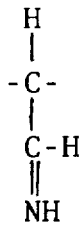

column 9, line 33, for "acelerations" read -- accelerations --; line 37, for "instaneous" read -- instantaneous --; line 42, for "wil" read -- will --; column 10, line 64, for "iridium" read -- irridium --.

Signed and sealed this 17th day of August 1965.

(SEAL)
Attest:

ERNEST W. SWIDER                               EDWARD J. BRENNER
Attesting Officer                              Commissioner of Patents